US009499676B2

(12) United States Patent
Burmeister et al.

(10) Patent No.: US 9,499,676 B2
(45) Date of Patent: Nov. 22, 2016

(54) PROCESS FOR PRODUCING A SYNTACTICALLY FOAMED POLYMER COMPOSITION, PREFERABLY A PRESSURE-SENSITIVE ADHESIVE COMPOSITION, APPARATUS FOR CARRYING OUT THE PROCESS, EXTRUDATE AND SELF-ADHESIVE TAPE

(71) Applicant: tesa SE, Hamburg (DE)

(72) Inventors: Axel Burmeister, Hamburg (DE); Franziska Czerwonatis, Hamburg (DE)

(73) Assignee: tesa SE, Norderstedt (DE)

( * ) Notice: Subject to any disclaimer, the term of this patent is extended or adjusted under 35 U.S.C. 154(b) by 192 days.

(21) Appl. No.: 14/273,144

(22) Filed: May 8, 2014

(65) Prior Publication Data

US 2014/0335338 A1    Nov. 13, 2014

(51) Int. Cl.
*B05D 5/10*      (2006.01)
*C08J 9/32*      (2006.01)
(Continued)

(52) U.S. Cl.
CPC .............. *C08J 9/32* (2013.01); *B29B 7/485* (2013.01); *B29B 7/487* (2013.01); *B29C 44/0407* (2013.01); *B29C 47/0004* (2013.01); *B29C 47/0071* (2013.01); *B29C 47/42* (2013.01); *B29C 47/807* (2013.01); *C08J 9/0066* (2013.01); *C08K 3/04* (2013.01); *C09J 5/08* (2013.01); *C09J 7/0217* (2013.01); *B29C 47/0009* (2013.01); *B29C 47/0021* (2013.01); *B29C 47/025* (2013.01); *B29C 47/026* (2013.01);
(Continued)

(58) Field of Classification Search
CPC ........... C08J 9/32; C09J 5/08; C09J 2205/11
USPC ........................................... 427/207.1, 208.4
See application file for complete search history.

(56) References Cited

U.S. PATENT DOCUMENTS 3,565,247 A    2/1971   Brochman
3,615,972 A    10/1971  Morehouse, Jr. et al.
(Continued)

FOREIGN PATENT DOCUMENTS

DE    21 05 877 A1    8/1972
DE    35 37 433 A1    10/1986
(Continued)

*Primary Examiner* — Xiao Zhao
(74) *Attorney, Agent, or Firm* — Norris McLaughlin & Marcus, P.A.

(57) ABSTRACT

Process for producing a syntactically foamed polymer composition, comprising
a) introducing expandable microspheres into a matrix material and mixing in a mixing machine,
b) expanding the microspheres,
c) the temperature distribution in the mixing machine being inhomogeneous in a plane perpendicular to the transport direction of the machine,
d) maintaining the temperature of a first surface bounding the mixing space of the mixing machine, in a plane perpendicular to the transport direction of the mixing machine, at a temperature sufficient for the polymer composition containing the microspheres coming into contact with such first bounding surface to reach a temperature sufficient for commencement and continuation of expansion,
e) maintaining a second surface bonding the mixing space in the same plane at a temperature sufficiently low for the polymer composition containing the microspheres coming into contact with it, not to reach a temperature sufficient for commencement and continuation of expansion.

19 Claims, 1 Drawing Sheet

(51) Int. Cl.
  *B29B 7/48* (2006.01)
  *B29C 47/42* (2006.01)
  *B29C 47/00* (2006.01)
  *C08J 9/00* (2006.01)
  *C08K 3/04* (2006.01)
  *C09J 5/08* (2006.01)
  *C09J 7/02* (2006.01)
  *B29C 44/04* (2006.01)
  *B29C 47/80* (2006.01)
  *B29C 47/82* (2006.01)
  *B29C 47/84* (2006.01)
  *B29K 105/00* (2006.01)
  *B29K 105/04* (2006.01)
  *B29C 47/02* (2006.01)

(52) U.S. Cl.
  CPC ............ *B29C47/822* (2013.01); *B29C 47/845* (2013.01); *B29C 2947/92704* (2013.01); *B29C 2947/92809* (2013.01); *B29K 2105/0097* (2013.01); *B29K 2105/04* (2013.01); *B29K 2105/048* (2013.01); *C08J 2203/22* (2013.01); *C08J 2207/02* (2013.01); *C08J 2333/06* (2013.01); *C08J 2333/08* (2013.01); *C09J 2205/11* (2013.01); *C09J 2433/00* (2013.01); *C09J 2433/005* (2013.01)

(56) References Cited

U.S. PATENT DOCUMENTS

| | | |
|---|---|---|
| 4,735,837 A | 4/1988 | Miyasaka et al. |
| 6,103,152 A | 8/2000 | Gehlsen et al. |
| 6,797,371 B1 | 9/2004 | Gehlsen et al. |
| 2003/0138624 A1 | 7/2003 | Burmeister et al. |
| 2009/0181250 A1 | 7/2009 | Zmarsly et al. |

FOREIGN PATENT DOCUMENTS

| | | |
|---|---|---|
| DE | 197 30 854 A1 | 1/1999 |
| DE | 10 2008 004 388 A1 | 7/2009 |
| EP | 0 257 984 A2 | 3/1988 |
| EP | 0 693 097 A1 | 1/1996 |
| EP | 1 102 809 B1 | 6/2005 |
| WO | 95/31225 A1 | 11/1995 |
| WO | 95/32851 A1 | 12/1995 |
| WO | 98/18878 A1 | 5/1998 |

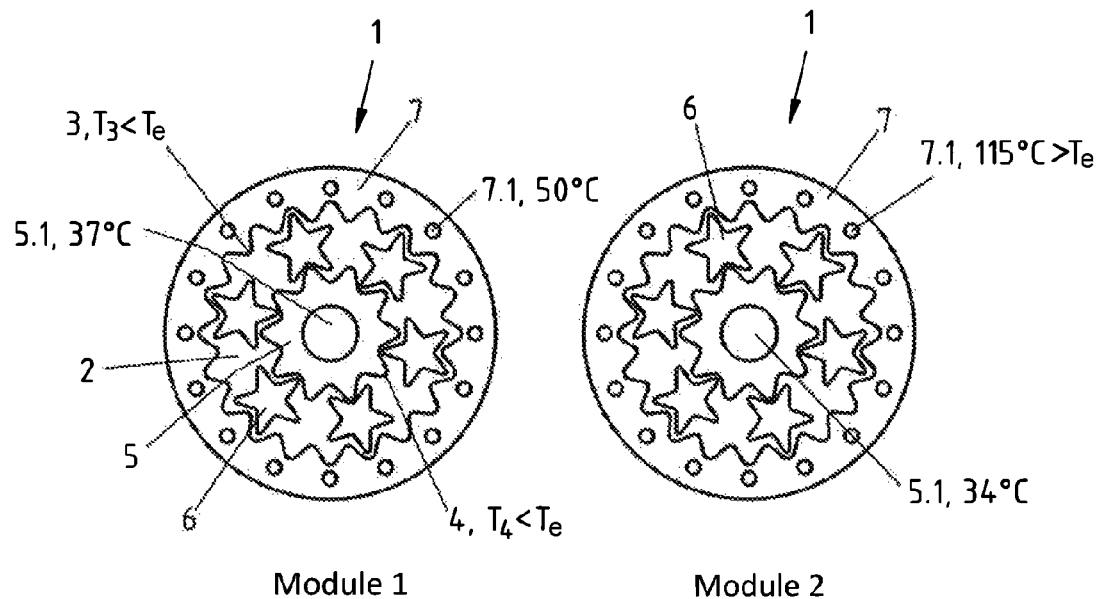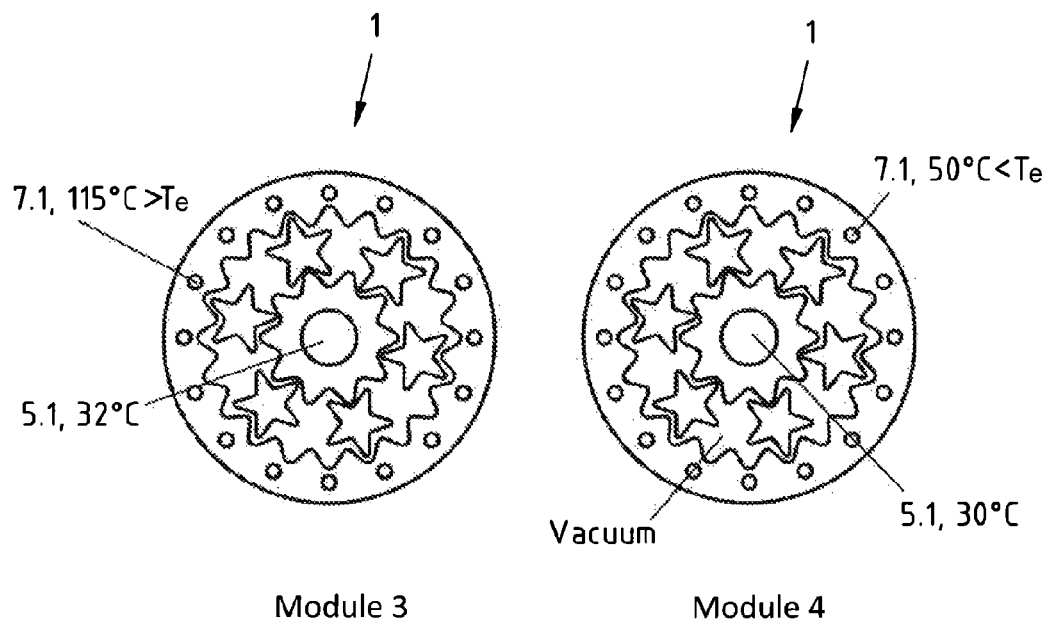

PROCESS FOR PRODUCING A SYNTACTICALLY FOAMED POLYMER COMPOSITION, PREFERABLY A PRESSURE-SENSITIVE ADHESIVE COMPOSITION, APPARATUS FOR CARRYING OUT THE PROCESS, EXTRUDATE AND SELF-ADHESIVE TAPE

This application claims priority of German Patent Application No. 10 2013 208 445.5, filed on May 8, 2013, the entire contents of which is incorporated herein by reference.

The invention describes processes for producing a syntactically foamed polymer composition, preferably a pressure-sensitive adhesive composition, where
 a) at least the majority of the closed foam voids are achieved by introduction of expandable microspheres into a matrix material and subsequent mixing and
 b) the expansion of the expandable microspheres is carried out after they have been introduced into the matrix material,
 c) where the temperature distribution in the mixing machine (1) is inhomogeneous in a plane perpendicular to the transport direction of this machine (1).

The invention also describes two apparatuses for carrying out the abovementioned process, an extrudate and also a self-adhesive tape which is produced by the abovementioned process.

The word "syntactically" means that at least the foam voids away from the periphery are completely surrounded by a matrix material and closed off thereby.

BACKGROUND OF THE INVENTION

Self-adhesive compositions foamed by means of expandable microspheres are known. Compared to open-celled foamed self-adhesive compositions, they achieve better sealing against dust and liquids due to their closed cells. Compared to unfoamed self-adhesive compositions they adapt better to the roughness of a substrate to be adhesively bonded. Compared to self-adhesive compositions foamed by means of hollow glass spheres, they are more deformable and better equalize thermal expansion differences between various adhesively bonded materials in the case of fluctuating temperatures and damp vibrations and insulate against vibrations better.

The thickness of the shell of the microsphere and the thermoplastic polymer of which it consists influence the mechanical properties of the foam just as much as the unexpanded diameter of the microsphere and the type of blowing agent present in the interior thereof. These parameters also influence the expansion start temperature, the expansion rate, the maximum expansion capability and the robustness of the microsphere.

Many types of expandable microspheres are commercially available; preference is given to using unexpanded types for the purposes of the invention because these have a greater expansion capability than the previously expanded types. Within the class of unexpanded microspheres, there are many types from various manufacturers; they differ essentially in their diameter (from 6 to 9 µm in the case of smallest types of Expancel, namely 461 DU 20, and from 28 to 38 µm in the case of the largest types of Expancel, namely 920-, 930-, and 951 DU 120) and their temperatures required for starting expansion (from 75 to 220° C.). One example of commercially available microspheres are the Expancel® DU grades (DU=dry unexpanded) from Akzo Nobel.

The word "uniform" (="homogeneous") is used in the present application in the sense that the specific mass of a test specimen taken from the product, whose edge length naturally has to be substantially greater (i.e. at least about 30 times as large) than the diameter of the largest expandable microsphere therein, is virtually independent of where in the product this test specimen is taken. This word therefore does not mean, for instance, that all expanded microspheres have to have the same size; they could not have the same size because their precursors, the unexpanded microspheres, are produced in a random process and therefore have a certain fluctuation from individual microsphere to individual microsphere both in terms of their diameter and in their wall thickness.

The production of expandable microspheres is described in principle in U.S. Pat. No. 3,615,972 by Dow.

DE 21 05 877 C discloses a self-adhesive tape having a support which is coated on at least one side with a microcellular self-adhesive composition (also referred to as "pressure-sensitive adhesive"). This adhesive layer contains a nucleating agent, and the cells of the adhesive layer are closed and distributed "uniformly" in the adhesive layer.

U.S. Pat. Nos. 6,103,152 and 6,797,371, which correspond to EP 1 102 809 B1, teach a process for producing polymer foam by means of expandable microspheres. In a public nullity action against the German part of the European patent, the patent proprietor has stated that the expression "commencement of foaming before leaving the die", which from the context obviously means the shaping die at the end of a second extruder, is actually intended to mean commencement of foaming in the die. The German Federal Court has followed this in its decision "Polymerschaum" of 17 Jul. 2012 (File no.: XZR 117/11, paragraph 31, last sentence).

EP 0 257 984 A1 describes self-adhesive tapes which have a foamed adhesive layer containing microspheres on at least one side. According to page 3, lines 38 to 41, the microspheres can be mixed in their unexpanded state into the adhesive composition and expanded by means of later heating, or, preferably, be expanded first and then mixed into the adhesive composition.

The further documents DE 35 37 433 A1, WO 95/31225 A1, WO 95/32851 A1, EP 0 693 097 A1, WO 98/18878 A1 and DE 197 30 854 A1 appear to be less relevant.

DE 10 2008 004 388 A1 teaches a process for producing an unfoamed self-adhesive composition using natural rubber as base polymer. In these contexts, examples 5 and 6 on pages 23 and 24 teach a production process using, inter alia, a planetary-gear extruder. When the "heating zones" there are indicated to be the two radially outermost, standing hollow gears of a two-module planetary-gear extruder, it is proposed there that the temperature of the hollow gear is maintained at 50° C. in both modules, while the sun gear (=central spindle) is maintained at only 10° C.

SUMMARY OF THE INVENTION

It is an object of the invention to maintain the homogeneity of the mixture of microspheres and matrix mixture, at least compared to the products known hitherto, of which those produced as described in EP 1 102 809 B1 appear to be the closest, in a process which subjects the matrix polymer to less thermal and mechanical stress. The mixing process sought should not increase the proportion of destroyed microspheres and preferably reduce it further. The peak-to-valley heights of the foamed extrudate should preferably be reduced.

To the inventor's surprise, the inventor has found, by following up phenomena which were initially considered to be measurement errors, that homogeneous distribution of microspheres can be achieved particularly well and efficiently when the temperature distribution in the mixing machine is inhomogeneous perpendicular to the transport direction of this machine. In particular, according to the invention, d) a first surface (3) bounding the mixing space (2) of the mixing machine (1) should, in a plane perpendicular to the transport direction of the mixing machine (1), be maintained at a temperature which is sufficiently high for the polymer composition containing the microspheres, insofar as it comes into contact with this first bounding surface (3), to reach a temperature ($T_E$) which is sufficient for commencement and continuation of expansion, e) while in the same plane perpendicular to the transport direction of the mixing machine (1), a second surface (4) bounding the mixing space (2) of the mixing machine (1) is maintained at a temperature which is sufficiently low for the polymer composition containing the microspheres, insofar as it comes into contact with this second bounding surface (4), not to reach a temperature ($T_e$) which is sufficient for commencement and continuation of expansion.

DETAILED DESCRIPTION

In a single-screw extruder as mixing machine, it is advisable to provide the temperature difference according to the invention between screw and barrel. When acrylates and/or methacrylates are used as matrix base polymer, optionally together with a tack-increasing resin, it is advisable for the temperature difference to be such that I: the screw is cooler than the barrel, preferably by at least 50° C., particularly preferably by from 65° C. to 90° C.

When, however, polyethylene and/or polypropylene and/or polyethylene-vinyl acetate and/or polypropylene-vinyl acetate and/or copolymers of some or all of the monomers mentioned are used as matrix base polymer, optionally together with a tack-increasing resin, it is advisable for the temperature difference conversely to be such that II: the screw is hotter than the barrel; but the preferred absolute value of the temperature difference remains the same, namely at least 50° C., particularly preferably from 65° C. to 90° C.

In a twin-screw extruder as mixing machine, there are various possibilities for configuration of the desired inhomogeneous temperature field in a plane perpendicular to the transport direction, namely, making a distinction only between hot and cold:

III: one screw cold, the other hot, barrel cold,
IV: one screw cold, the other hot, barrel hot,
V: both screws cold, barrel hot,
VI: both screws hot, barrel cold.

For the purposes of the present invention, "hot" means a component temperature which heats a composition which contains expandable microspheres and comes into contact with this component sufficiently for expansion to occur, while "cold" means a component temperature which keeps the composition which contains expandable microspheres and comes into contact with this component at a temperature which is too low for expansion to occur.

Possibility V is preferred when acrylates and/or methacrylates are used as matrix base polymer, optionally together with a tack-increasing resin. Here, too, the preferred absolute value of the temperature difference is at least 50° C., particularly preferably in the range from 65° C. to 90° C.

On the other hand, the possibility VI is preferred when polyethylene and/or polypropylene and/or polyethylene-vinyl acetate and/or polypropylene-vinyl acetate and/or copolymers of some or all of the monomers mentioned are used as matrix base polymer, optionally together with a tack-increasing resin. Here too, the preferred absolute value of the temperature difference is at least 50° C., particularly preferably in the range from 65° C. to 90° C.

This choice of configurations avoids both jamming in the bearings of the screws or spindles and also blockages in the feed shaft.

In a planetary-gear extruder which is preferred for industrial implementation of the invention, firstly because it has a compact construction and nevertheless a large surface area available for temperature control and the desired temperature inhomogeneity can be set reproducibly in a particularly wide range and secondly because the annular structure of this type of apparatus avoids, despite the inhomogeneous distribution, occurrence of jamming in bearings due to different thermal expansions, there are many different configurations of temperature differences which can be produced. The construction of a planetary-gear extruder remains particularly simple when active temperature control ("temperature control" is for the purposes of the present patent application used as a collective term for "heating" and "cooling") of the planetary gears is dispensed with. Although very many possible configurations disappear, the following two are retained:

VII: cool sun gear and hot hollow gear or
VIII: hot sun gear and cool hollow gear.

In a manner analogous to possibility I in the case of a single-screw extruder and to possibility V in the case of a twin screw extruder, possibility VII is preferred in the case of the planetary-gear extruder when acrylates and/or methacrylates are used as matrix base polymer, optionally together with a tack-increasing resin. Here, too, the preferred absolute value of the temperature difference is at least 50° C., particularly preferably in the range from 65° C. to 90° C.

Furthermore, in a manner analogous to possibility II in the case of a single-screw extruder and to possibility VI in the case of a twin screw extruder possibility VIII is preferred in the case of the planetary-gear extruder, when polyethylene and/or polypropylene and/or polyethylene-vinyl acetate and/or polypropylene-vinyl acetate and/or copolymers of some or all of the monomers mentioned are used as matrix base polymer, optionally together with a tack-increasing resin. Here too, the preferred absolute value of the temperature difference is at least 50° C., particularly preferably in the range from 65° C. to 90° C.

The inventor has discovered that possibility VII allows substantial expansion of the microspheres in the planetary-gear extruder even during mixing. Such early expansion has hitherto been considered to be impossible because an excessive number of destroyed microspheres whose shell thickness in the expanded state is only about 0.02 µm was feared. For this purpose, the internally toothed hollow gear of the planetary-gear extruder is brought to a sufficiently high temperature for the polymer composition containing the microspheres, insofar as it comes into contact with this hollow gear, to reach a temperature which is sufficient for commencement and continuation of expansion. At the same time, the externally toothed sun gear should be brought to a temperature which is sufficiently low for the polymer composition containing the microspheres, insofar as it comes into contact with this sun gear, not to reach a temperature which is sufficient for commencement or continuation of expansion.

If later for other purposes, whether for driving off residual gases such as air, residual solvent vapors, residual monomers, water vapor, the temperature of the composition does not have to be so high and the pressure applied to it does not have to be so low that further expansion of the microspheres is unavoidable, the process conditions during mixing in the planetary-gear extruder (in particular barrel temperature, central spindle temperature, speed of rotation, degree of fill and pressure) can be selected so that the average technically practicable expansion capability, which is given on achievement of about ¾ of the maximum volume which can be achieved under the finest laboratory conditions, has been completely exhausted by conclusion of mixing.

Depending on the microsphere type used with its foaming temperature, it is thus possible to use a temperature profile in the radial and longitudinal directions during mixing which is such that foaming at least commences during mixing. The inventor explains the astonishing effect, namely that the microspheres survive their commencement of expansion during mixing unscathed, by the fact that particularly gentle contact exists between the planetary gears and the hollow gear. Compared to two outer teeth engaging with one another, the teeth of the planetary gears dip gradually and gently, in particular with more gentle shear peaks, into the gaps between the teeth of the hollow gear and draw out again equally gently after the point of deepest intrusion. The same applies analogously to the teeth of the hollow gear on dipping into and coming out of the gaps between the teeth of the planetary gears.

Furthermore, the inventor presumes that the rougher meshing of the planetary gears with the sun gear has barely any adverse effects on the microspheres because in this contact zone the composition to be mixed, at least in the case of the acrylate and acrylate-methacrylate adhesive compositions tested so far for this purpose, adheres to a lesser extent because of the cooler temperatures there and less composition is therefore held up there. In addition, even this contact is, in terms of the height of the shear peaks, not to be compared with a co-rotating twin-screw extruder but only with a contrarotating, and thus intermeshing in the radial plane and not visibly slipping, twin-screw extruder, which is unconventional except for PVC processing. The tendency for blockages to occur in the contrarotating extruder is not observed in the case of the planetary-gear extruder (the inventor presumes: because of the lack of rigid enclosure of planetary gears and sun gear) and also the usually lamented reduced mixing action does not occur in combination with the inhomogeneous temperature profile according to the invention in a plane perpendicular to the transport direction of the mixing machine.

The easier achievement of homogeneous mixing is particularly clear when the temperature difference between the hotter hollow gear and the cooler sun gear is at least 50° C. Particular preference is given to a temperature difference in the range from 65° C. to 90° C., especially since the commencement of expansion can be controlled particularly reliably during mixing. On the other hand, even higher temperature differences have been found to be superfluous for the effect to be achieved and represent only an unnecessary outlay of money for unnecessarily intensive heating and especially unnecessarily intensive cooling.

With acceptance of additional outlays for cooling and heating, the invention makes possible particularly high homogeneity of the mixture and, in a preferred embodiment of the invention, a particularly early commencement of expansion with particularly precise control of the degree of expansion and a particularly low proportion of destroyed microspheres. The earlier commencement of expansion also allows earlier ending of expansion; this not only has a cost advantage but also allows cooler passage through the shaping extrusion die with the further advantages of lower dimensional tolerances in the finished product and a smoother surface. Even without additional smoothing measures, for instance subsequent lamination with a super-smooth liner and/or calendering, possibly only after application of the liner, peak-to-valley heights of less than 12 μm, with particular care down to 5 μm, are achieved on the extrudate.

The easier and improved mixing due to the temperature inhomogeneity according to the invention is gentle not only on the microspheres but, as intended, also on the matrix polymers due to overall lower mechanical stressing and lower thermal stress. Thus, the degradation of the polymers remains lower. The cost advantage achieved by the ability to stop mixing and expansion more rapidly and the quality advantages achieved outweigh the cost disadvantage due to higher heating and cooling costs.

The matrix surrounding the microspheres in the product according to the invention contains essentially polymers. When the matrix is to be self-adhesive, it preferably contains acrylates and/or methacrylates and/or polyolefins and/or natural rubber and/or styrene-butadiene rubber, preferably also one or more tack-promoting resins. The use of thermoplastic elastomers such as styrene block copolymers, for example styrene-isoprene-styrene (SIS) and styrene-butadiene-styrene (SBS) grades, is also possible.

As tack-promoting resins, it is possible to use oligomeric and low-polymeric compounds having a number average molecular weight $M_n$ of up to 5000 g/mol. Possibilities are, in particular, pinene, indene and rosin resins, disproportionated, hydrogenated, polymerized, esterified derivatives and salts thereof, aliphatic and aromatic hydrocarbon resins, terpene resins and terpene-phenol resins and also C5-, C9- and other hydrocarbon resins, in each case on their own or in combination with one another. All resins which are soluble in the polymer composition, e.g. all aliphatic, aromatic, alkylaromatic hydrocarbon resins, and hydrocarbon resins based on pure monomers, hydrogenated hydrocarbon resins, functional hydrocarbon resins and natural resins, can particularly advantageously be used. Preferred terpene-phenol resins are Dertophene T105 and Dertophene T110; a preferred hydrogenated rosin derivative is Foral 85. The proportion of resin is made as low as possible with a view to the achievable shear survival times and made as high as necessary with a view to the tack and vibration damping necessary for the use.

Furthermore, it is possible to add plasticizers such as low molecular weight polyacrylates, polymethacrylates, phthalates and polyphosphates in order to achieve a further increase in the deformability, impact toughness and vibration damping capability, often associated with a small increase in tack.

For most applications crosslinking of the matrix material is also advantageous. Even though such crosslinking is advantageously carried out only at the end of the process, it has to be taken into account in the selection of the materials used at the beginning. Thus, the addition of a crosslinker such as sulfur or peroxide can be useful when using natural, isoprene or SBR rubber and/or the incorporation, preferably at the beginning to the monomers used for polymer production, of functional groups which can later be crosslinked with one another in the case of the use of other polymers. Possibilities here are, in particular, olefinically unsaturated monomers having functional groups which can undergo a reaction with epoxide groups. Preference is given here to monomers having functional groups from the following classes: hydroxy groups, carboxy groups, sulfonic acid groups, phosphonic acid groups, acid anhydrides, epoxides and amines. Particularly preferred examples of such monomers are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate and glycidyl methacrylate.

As is known per se, crosslinking reactions can be initiated by introduction of energy, namely by means of UV radiation, electron beam or heating. The crosslinking initiators to be mixed into the matrix should be selected according to the desired type of energy. When the crosslinking reaction is to be triggered thermally, as is preferred for the production of products in the case of which colored and therefore compositions which have little or no transparency are to be processed or in the case of which layer thicknesses above about 160 μm are to be produced, then the type of microsphere used, the temperature profile and also the place at which the initiator is added should preferably be matched to one another so that crosslinking does not commence very much earlier than shaping, whether the latter occurs in a mold, a calendering roller and/or an extrusion die. Suitable thermally activatable crosslinkers for the particularly preferred acrylates and methacrylates are, in particular, isocyanates and epoxide compounds.

Accelerators and/or retarders for the crosslinking reaction can also advantageously be added, retarders especially when the crosslinker is added at the beginning of the extruder to minimize the mixing outlay in terms of time and apparatus, assuming that it is even during mixing subjected in the radially outermost region of the planetary-gear extruder which is preferably used to temperatures which allow crosslinking to commence. As an alternative or in addition to the use of retarders, it is possible to incorporate blocking or steric hindrance in the crosslinking isocyanate, e.g. by means of alcohols, phenol derivatives or amines. Especially when some yellowing tendency is not a problem in the application to be served, preference is given to employing somewhat more retardation than necessary for the above-described purpose in order to be able to counter this excess by a little crosslinking accelerator, e.g. amines, in the mixture. In general, this gives a lower sensitivity of the course of crosslinking over time in respect of the fluctuations which can never be avoided completely in the process sequence and thereby even lower fluctuations in the product quality.

When the planetary-gear extruder is divided into a plurality of modules and the crosslinker has to be activated thermally and it can also be distributed sufficiently homogeneously in a short mixing distance, the addition of the crosslinker in one of the later modules of the planetary-gear extruder or even in a further downstream extruder is preferred however because the process conditions which are particularly advantageous for mixing and foaming have to take less account of the crosslinker and of the viscosity increase associated with its premature and/or excessively vigorous crosslinking.

As regards the configuration of the respective hollow gear and planetary gears meshing therein, each module of a multimodule planetary-gear extruder looks like an independent (one-module) planetary-gear extruder, but a single central spindle runs through the various modules. In contrast to four one-module planetary-gear extruders arranged in series, where a motor and gearbox is required for each of the four central spindles, a four-module planetary-gear extruder requires only one motor and only one gearbox. Even though these have to be made correspondingly stronger, the single stronger drive leads to better efficiency than four weaker drives, due to a reduced risk of breaking down and lower maintenance costs.

The polymer foam preferably contains at least 25% by weight, based on the total weight of the polymer foam, of an acrylic polymer, either a polyacrylate or polymethacrylate or poly(acrylate-co-methacrylate) or a copolymer, which can be attributed to the following monomer composition:

(a) acrylic esters and/or methacrylic esters of the formula $$CH_2=C(R^I)(COOR^{II}),$$

where $R^I$=H or $CH_3$ and $R^{II}$ is an alkyl radical having from 4 to 14 carbon atoms, (b) relatively small amounts of olefinically unsaturated monomers having functional groups which are reactive toward the crosslinker substances or part of the crosslinker substances, as listed in detail two paragraphs ago, (c) optionally, in relatively small amounts, acrylates and/or methacrylates other than (a) and/or (d) optionally further monomers which are olefinically unsaturated and copolymerizable with the component (a).

The words "in relatively small amounts" means additions at which the proportion by weight of the added component is less than one quarter of that of the component (a).

For the purposes of the present patent application, the compounds of the group (a) are referred to as "acrylic monomers". Preference is given to using acrylic monomers whose alkyl groups contain from 4 to 9 carbon atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate, n-nonyl methacrylate, isobutyl acrylate, isobutyl methacrylate, isooctyl acrylate, isooctyl methacrylate, and branched isomers thereof, for example 2-ethylhexyl acrylate and 2-ethylhexyl methacrylate.

Furthermore, group (a) also includes dodecyl methacrylate, lauryl acrylate, n-undecyl acrylate, n-tridecyl acrylate, sec-butyl acrylate, tert-butyl acrylate, isodecyl acrylate; these monomers are also possible for building up the copolymer.

For polymers which contain the component (c) and/or (d), it is in principle possible to use all vinylically functionalized compounds which can be copolymerized with the component (a) and/or the component (b). These monomers preferably also serve to adjust the properties of the resulting polymer foam. The following monomers for the component (c) may be mentioned by way of example: methyl acrylate, ethyl acrylate, propyl acrylate, methyl methacrylate, ethyl methacrylate, benzyl acrylate, benzyl methacrylate, phenyl acrylate, phenyl methacrylate, isobornyl acrylate, isobornyl methacrylate, t-butylphenyl acrylate, t-butylphenyl methacrylate, stearyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate or macromonomers such as 2-polystyrene-ethyl methacrylate (molecular weight Mw of from 4000 to 13 000 g/mol), poly(methyl methacrylate)-ethyl methacrylate (Mw of from 2000 to 8000 g/mol).

The following monomers for the component (d) may be mentioned by way of example: dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, also N,N-dialkyl-substituted amides, such as N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, a- and p-methylstyrene, a-butylstyrene, 4-n-butylstyrene, 4-n-decylstyrene, 3,4-dimethoxystyrene.

Monomers of the component (c) can also be advantageously selected so that they contain functional groups which aid subsequent radiation-chemical crosslinking (for example by means of electron beams, UV). Suitable copolymerizable photoinitiators are, for example, benzoin acrylate and acrylate-functionalized benzophenone derivatives. Monomers which aid crosslinking by electron beam are, for example, tetrahydrofurfuryl acrylate, N-tert-butylacrylamide and allyl acrylate.

A polymer forming the matrix particularly advantageously also contains acrylic and/or methacrylic acid in copolymerized form.

For a preferred use of the polymer foam as pressure-sensitive adhesive, the proportions of the respective components (a), (b), (c) and (d) are preferably selected so that the polymerization product has a glass transition temperature of 15° C. (DMA at low frequencies). For this purpose, it is advantageous to use the monomers of component (a) in a proportion of from 45 to 99% by weight, the monomers of component (b) in a proportion of from 1 to 15% by weight and the monomers of components (c) and (d) in a proportion of from 0 to 40% by weight, where the amounts indicated are based on the monomer mixture of the "base polymer", i.e. without addition of any additives such as resins, etc. to the finished polymer.

For use of the polymer foam as hot melt adhesive, i.e. as a material which becomes tacky only as a result of heating, the proportions of the respective components (a), (b), (c) and optionally (d) are preferably selected so that the copolymer has a glass transition temperature ($T_G$) in the range from 15° C. to 100° C., more preferably from 30° C. to 80° C. and particularly preferably from 40° C. to 60° C.

The matrix can also contain fillers such as titanium dioxide, zinc oxide, carbon black, chalk (=calcium carbonate, $CaCO_3$) and other additives such as aging inhibitors, flame retardants, fungicides and the like. In addition, it is possible to use nonexpandable microspheres, for example, hollow glass microspheres, in addition to the expandable microspheres, i.e. those having a polymeric shell and a blowing agent therein, which preferably makes a large increase in volume possible by vaporization.

It is customary firstly to mix the abovementioned constituents which are less sensitive than the microspheres to temperatures, pressures and shear stresses occurring in the process and to mix in the microspheres which are considered to be more sensitive, optionally together with thermally likewise sensitive crosslinkers and any crosslinking retarders, later. However, this type of gentle treatment of the microspheres does not spare the budget of the manufacturer because it makes the total mixing time and the total length of the mixing machine required rather long, and in particular it does not spare the matrix polymers which are subjected to relatively long mechanical and thermal stress.

After the description of the basics and important embodiments of the process of the invention, a description will now be given of the apparatus suitable for this purpose:

The hollow gear of the planetary-gear extruder is also referred to as "toothed barrel" or "barrel" or "hollow roller" or "roller casing", "internally toothed cylinder", and the like; there is a considerable variety of terms. Regardless of the name used for it, its stationary nature aids both heating and cooling. To heat the hollow gear, in particular, as preferred for the processing of acrylates of any type as base polymer, as described in more detail at an earlier point, and since sufficient hot water or steam is in any case available from other processes, hot water or steam should be used, otherwise electric heating wires. For cooling the hollow gear, in particular as preferred for the processing of predominantly polyolefinic compositions, as described in more detail at an earlier point, cold water which flows through a cooling apparatus connected in series, preferably a cooling apparatus operating according to the Linde principle, and a circulating pump should circulate through the liquid channels of the barrel.

To produce the temperature gradient according to the invention in the radial plane of the extruder, the temperature of the sun gear (=sun roller=central spindle) should advantageously also be able to be actively controlled; in particular for the processing of acrylates of any type as base polymer, heat should, as described in detail at an earlier point, be withdrawn from the sun gear. For this purpose, a cooling device, preferably cold water channels, should be arranged therein. These cold water channels should be connected to an external refrigerator preferably operating according to the Linde principle.

In the control apparatus for cooling the hollow gear (as described first) or the sun gear (as described last), the measured temperature fluctuations advantageously have a range of frequencies and the low-frequency temperature fluctuations are evened out by influencing the drive power of the refrigerator and the higher-frequency temperature fluctuations are evened out by influencing the drive power of the circulation pump between refrigerator and hollow gear or sun gear, because the circulating pump power can be adjusted with a less delayed response than the compressor power in the refrigerator.

Back to the Process:

On the way to the invention, the inventor recognized that improving the degree of homogeneity achieved up to a particular point in the process becomes all the more difficult, the higher the degree of homogeneity achieved up to that point. Going from "unsatisfactory" to "acceptable" is therefore easier than the step from "acceptable" to "satisfactory", and this is in turn easier than the further step to the assessment "good". The inventor had also recognized that the important thing during mixing is virtually solely uniform distribution of materials, for example microspheres, rather than uniform distribution of individual items at different temperatures, whether they are molecules as in the case of polymers and resins or one piece of the same material as in the case of the microspheres. Building on this, the inventor developed the concept of subjecting the materials to be mixed to significantly different temperatures. The driving force to natural temperature equalization which is increased thereby also promotes mixing of materials. This advantage is particularly prominent in the mixing of microspheres since these are enormous relative to the size of polymer molecules.

While the heating/cooling difference according to the invention is helpful in the cross-sectional planes reached at an early juncture by the stream to be mixed, it is even more important in the last module provided for mixing. The temperature difference set between hot and cool components is therefore preferably the greatest there. Since the most important objective of the invention is to reduce the mechanical and thermal stresses on the matrix polymers, it appears to be advisable to cool the cold component to a particularly great extent in the extruder zone in which final mixing occurs and less so to heat the hot component to a particularly great extent.

In the configuration of the inhomogeneous temperature field which is preferred for the processing of acrylates of all types to be foamed, i.e. with a significantly cooler central spindle compared to the hollow gear, the inventor has also concluded that the cooling of the sun roller (=sun gear), which increases the mixing power, with simultaneous heating of the hollow gear should be particularly great in the final phase of mixing (viewed in the longitudinal plane of the mixing machine). Preference is therefore given to the coolant flowing into the interior of the sun roller in a direction counter to the polymer transport direction.

Another embodiment of the process of the invention is characterized in that the expandable microspheres are firstly suspended in water before being introduced. In combination with this suspension, i.e. not the dry microspheres, firstly being introduced into the matrix-forming polymer composition and then mixed in, the later expansion of the microspheres is advantageously commenced at temperatures which are below the expansion start temperature indicated by the microsphere manufacturer. This manufacturer's data applies only to the dry microspheres, according to the new recognition.

The measure of prior suspension in water thus not only reduces the risk of dust formation and explosion at the place where the microspheres are fed in but also acts as plasticizer for the shell of the microspheres, particularly when this contains polyacrylonitrile rubber. Although suspension of expandable microspheres in water is known (such pastes can be bought in finished form under the trade name Expancel© from Akzo Nobel), the effect of this suspension step on the expansion behavior of the microspheres and the teaching, based on this recognition, that the expansion should be started below the expansion start temperature are not. The lower temperature level during expansion in the further developed process spares the matrix polymers even further.

The inventor recognizes that suspension in water introduces water into the mixture in such a way that, apart from the water which diffuses into and through the shell of the microspheres, virtually no independent water droplets are formed in the mixture but instead the microsphere surfaces are wetted with water. This is successful at least in the case of microspheres having a shell which consists essentially of polyacrylonitrile. The inventor expects that this effect will also succeed with other types of microspheres as long as only the polarity of the shell material matches that of water. This wetting of the microsphere surfaces results, as the inventor discovered, in lubrication and a reduction in adhesion between microsphere and matrix material, which aids mixing-in further and at the same time reduces the shear stress on the microspheres during mixing-in.

Both the water-microsphere emulsions produced in-house and the finished emulsions purchased suffer from the problem that demixing occurs when left to stand because the specific gravities of water and microspheres are not the same. Such demixing was, as the inventor recognized in painstaking work, the reason for low-frequency disturbances in the microsphere introduction over the extrudate length, so that these could no longer be compensated by mixing and were reflected as density fluctuation in the final product. The obvious solution, namely to stir the stock emulsion continuously, occurred either with a stirrer power which was too low to eliminate this defect or gave an excessively high proportion of microspheres destroyed by this stirring. At least in the case of compositions which are in any case to be produced with a black color, the inventor thought of the simple but effective teaching that a change should be made from a two-material system to a three-material system, by introducing carbon black as third material. It has been found to be particularly effective firstly to emulsify carbon black in water to give a sufficiently fluid black paste and only then add the microspheres, after which a thicker black paste is obtained.

To achieve the greatest possible strength in the finished extruded product, the water content of the mixture, i.e. preferably the self-adhesive composition, should be reduced again sometime after introduction of the aqueous carbon black-microsphere suspension; this is preferably, to maintain the lubricating effect of the water for a long time and make best possible use of this effect, carried out only after homogeneous distribution of the microspheres in the matrix-forming composition has been largely achieved. Application of subatmospheric pressure, which forces the removal of water, is therefore preferably carried out only in a late stage of processing of the composition. The removal of water can be arranged in the last module of the planetary-gear extruder, but can also be arranged in a separate apparatus further downstream, for example a single-screw extruder.

During the removal of water, wherever it may be arranged, a subatmospheric pressure should be applied to force this removal. To force the removal of water further, a temperature close to 100° C. or just above, is also advantageous; this preferred feature can easily be employed when, in particular, the microsphere type is selected so that the expansion start temperature is above 100° C.

The concept disclosed here and in the previous six paragraphs of softening the microspheres by emulsification in water and thus lowering their expansion start temperature and also carrying out at least considerable parts of the expansion at a temperature below the expansion start temperature indicated previously by the manufacturers only for dry microspheres can also be realized independently, i.e. independent of any inhomogeneity of the temperature field in the cross section according to the main invention of the present patent application. The same also applies to the preferred embodiments of this secondary concept, namely firstly to emulsify carbon black in water and only then introduce microspheres into the emulsion and take off at least large parts of the water introduced together with the emulsion into the composition to be extruded again at the end of mixing or after mixing.

However, when the removal of water is carried out in combination with the inhomogeneous temperature field according to the main invention, at least one of the two bounding surfaces of the mixing space should have a temperature of close to or above 100° C.; in combination with carrying out the process in a planetary-gear extruder in combination with acrylates and/or methacrylates as base polymer of the composition to be processed, at least the hollow gear should have a temperature of close to or above 100° C. in the water removal section. The particular advantage of dewatering at a hollow gear temperature just below 100° C., preferably about 95° C., is that the boiling point is then exceeded in the composition to be dewatered only as a result of the additionally introduced heat of kneading. However, this kneading also ensures that no large water vapor caverns which could impair the quality of the final product are formed. If this kneading does not occur, whether due to an operational malfunction or due to the personnel supervising the plant taking a break, vaporization does not proceed in an uncontrolled manner. The formation of dangerous vapor pressures is thus also automatically prevented.

Just when the hotter bounding surface also remains below 100° C., it is advantageous if the other surface, i.e. the central spindle in the case of dewatering of acrylates and/or methacrylates in the last module of a planetary-gear extruder, is not cooled or at least not cooled too much. Thus, the highly inhomogeneous temperature distribution in the cross-sectional plane, which was previously so advantageous in the mixing modules, is thus no longer preferred in the dewatering step. As a further solution to this problem, preference is given to making the "cooling" channels in the central spindle in this dewatering region sufficiently large for their inside to be able to be lined with a thermally insulating sleeve. This measure simultaneously achieves two advantages, namely firstly that the central spindle is barely cooled where the coolant, which preferably flows from the back forward, should not yet effect cooling and secondly that the central spindle cools particularly well in the mixing region located before this dewatering and degassing region as a result of the interior wall of the cooling channels being left bare, because the coolant has barely heated up during passage through the dewatering and degassing region. The thermally insulating sleeve advantageously consists of a syntactically foamed polymer tube. A high air bubble content therein ensures good thermal insulation.

An analogous situation applies when using other extruder types and the analogous inverse applies in a temperature field of converse configuration, as is preferred for the processing of polyolefinic compositions; however, in the case of the configuration of the temperature inhomogeneity in the mixing modules which is preferred for mixing of polyolefinic compositions containing expandable microspheres, namely hot sun spindle and cool hollow gear, the substantial task of this inhomogeneity in the dewatering and degassing module can, because of the ability to control the cooling channels of the various modules separately, be achieved particularly simply and precisely by allowing hot and not cold water to circulate in the corresponding channels there.

In order for the microspheres not to expand or at least not to expand too much further during this removal of water, the microsphere types whose expansion start temperature even in the suspended state is above 100° C. are particularly useful for this embodiment of the invention; based on the inventor's experience with microspheres whose shell consists essentially of polyacrylonitrile, a 25° C. higher expansion start temperature should be expected for the dry material.

Self-adhesive tapes are preferably produced by the above-described process and its preferred embodiments. For this purpose, the polymer composition containing the microspheres

- is applied in a single layer to a support of a single-sided self-adhesive tape to be formed or
- is applied in a single layer to each of the two sides of a support of a double-sided self-adhesive tape to be formed or
- is applied in a single layer to a liner, after which this composite is either laminated with a composite after the first mirror coating or itself forms a double-sided, support-free self-adhesive tape.

As Regards the Apparatus Suitable for Carrying Out the Process:

To carry out a process according to the invention in a planetary-gear extruder using a temperature gradient from the hot hollow gear to the cooler sun gear, it is advantageous to provide a planetary-gear extruder in which the hollow gear contains a heating device. Compared to a planetary-gear extruder having heat supplied solely by the kneading work introduced, a much shorter and more reproducible start-up behavior of the plant is achieved when this is able not to be operated around the clock. In addition, the magnitude of the temperature gradient according to the invention can be set within wider limits and with greater precision.

To achieve the preferred configuration of the temperature gradient, namely from the hot hollow gear to the cooler sun gear, it is absolutely necessary for the sun gear to contain a cooling device. However, a temperature gradient having the inverse orientation can be produced without a cooling device in the sun gear.

To carry out the process with the preferred suspension of microspheres in water before they are introduced and with later removal of water, it is advantageous to provide a manufacturing plant which has a subatmospheric pressure zone downstream of the single-module or multimodule planetary-gear extruder and upstream of the first or only shaping apparatus (extrusion die and/or calendering roller). The removal of water occurs particularly well in the subatmospheric pressure zone, particularly well as water vapor.

As Regards the Products:

The invention also encompasses a self-adhesive tape which contains a foamed self-adhesive composition, or consists exclusively of this self-adhesive composition, which has been produced by the process of the invention. These self-adhesive tapes have a molar mass distribution in their self-adhesive composition which is particularly close to the molar mass distribution of the polymers used at the beginning of the process. The decrease in the greatest molar masses and the increase in the small molar masses is thus particularly small. It can be expected that the more gentle polymer treatment during production of a self-adhesive tape according to the invention leads to a greater long-term strength of this tape, i.e. leads to fatigue failure occurring only later.

Furthermore, self-adhesive tapes according to the invention have a particularly smooth surface; depending on the care taken and the purity of the ambient air, and thus also the extrusion die, self-adhesive tapes produced by extrusion alone achieve average peak-to-valley heights in the range from 12 to 2 μm. These self-adhesive tapes therefore adhere more readily than would be expected solely from the rheological data of the composition. This can be utilized to allow setting of a higher degree of crosslinking, the tack-reducing secondary effect of which can be tolerated to a considerable degree, in order to achieve higher shear survival times.

Owing to the particularly high fatigue strength of self-adhesive compositions processed according to the invention, it is sufficient for the production of most self-adhesive tapes for the self-adhesive layer or layers thereof to be produced in one layer from a self-adhesive composition processed according to the invention.

The invention is illustrated below with the aid of a preferred example:

Firstly, the base polymer was produced by free-radical polymerization in a conventional reactor; for this purpose the reactor was charged with
54.4 kg of 2-ethylhexyl acrylate,
20.0 kg of methyl acrylate,
5.6 kg of acrylic acid and
53.3 kg of an acetone/isopropanol solvent mixture (94:6).

After stirring for 45 minutes, under an atmosphere highly enriched in nitrogen gas to suppress the risk of fire and explosion, the reactor was heated to 58° C. and 40 g of Vazo® 67 from DuPont, i.e. 2,2'-azobis(2-methylbutyronitrile), were added. The outer heating bath was subsequently heated to 75° C. and the reaction was carried out with maintenance of this external temperature. After one hour, a further 40 g of Vazo 67 were added and after another four hours the solution was diluted with a further 10 kg of solvent, once again acetone/isopropanol mixture (94:6), to aid residual monomer migration and thereby increase the degree of polymerization and thus reduce the residual monomer content. After a further five and also after a further seven hours, 120 g of Perkadox© 16 from Akzo Nobel, i.e. bis(4-tert-butylcyclohexyl) peroxydicarbonate, were in each case additionally introduced to keep the polymerization reaction going. After a further five hours, i.e. after a total reaction time of 22 hours, the polymerization was stopped. A solids content of 55.9% had been achieved in the reactor up to this juncture.

The polyacrylate obtained in this way was measured in the laboratory for in-house quality control. For this purpose, the residual solvent content of a small sample was reduced to below 1% in a vacuum drying oven, after which the polymer was dissolved in 99% by weight of toluene (=methylbenzene according to IUPAC nomenclature). The K-value was then measured by the Fikentscher method, i.e. using a Vogel-Ossag viscometer maintained at 25° C. The K-value measured in this way was 58.8 and serves as a measure of the average molecular size of high-polymer materials (see also the journal Polymer, 1967, number 8, pages 381 ff.). An average molecular weight of $M_w$=746 000 g/mol, a polydispersity D ($M_w/M_n$) of 8.9 and a static glass transition temperature $T_g$ of −35.6° C. were also measured.

This acrylate copolymer serving as basis was subsequently concentrated to a residual solvent content below 0.3 percent by weight in a single-screw extruder.

In addition to the above-described production of the base polymer, the microspheres were prepared; for this purpose Expancel 051 DU 40 microspheres from Akzo Nobel, unexpanded diameter in the range from 10 to 16 μm, were introduced into an aqueous carbon black paste Levanyl Schwarz N-LF from Lanxess Deutschland GmbH. The purchased Levanyl carbon black paste contains, according to our knowledge, 40% of carbon black and 60% of water. The carbon black in the water stabilizes the three-component emulsion produced by addition of the microspheres to the carbon black paste from the beginning. Here "stabilization" means physical stabilization, i.e. prevention of demixing of the three components due to their differing densities. Owing to the water content of the purchased carbon black paste which is high in any case, no additional water has to be added thereto before the microspheres are mixed in. 69.5 parts by weight of Expancel 051 DU 40 microspheres were added to 100 parts by weight of Levanyl carbon black paste. The paste produced in this way thus contained 23.6% of carbon black, 35.4% of water and 41% of microspheres.

To gain the benefit of the preferred reduction in the temperature required for commencement of expansion, this paste containing the microspheres is, in a further embodiment of the invention, firstly stored at room temperature. Although the desired effect can be detected after only a few minutes of storage time, for this desired effect to be developed to the greatest possible extent and especially to constancy over the storage time and thus to quantitatively particularly easy and reliable reproducibility, a storage time of at least 12 hours is advisable. After this time, the effect of lowering of the expansion start temperature has asymptotically approached its maximum for t→∞ to such an extent that a further storage time barely increases this effect.

Only after the plasticizing effect of the water on the shells, containing essentially nitrile rubber, of the microspheres had been established, this paste composed of carbon black, water and microspheres was mixed into the base polymer, in an amount of 2.44 parts by weight to 100 parts by weight of polymer. This paste was introduced at the feed shaft of the planetary-gear extruder.

Furthermore, the following were introduced into the planetary-gear extruder at this feed shaft in proportions by weight based on 100 phr of base polymer:

| Additives | Proportion of the additives [w-phr %] |
|---|---|
| Acrylate polymer | 100 |
| Dertophene T110 | 40 |
| Aqueous carbon black - microsphere paste | 2.44 |
| Epikure © 925 | 0.2 |
| Polypox R16 | 0.19 |
| Total | 142.83 |

Polypox R16 is marketed by Dow Chemical, serves as crosslinker and according to IUPAC is pentaerythritol polyglycidyl ether.

Epikure 925 is marketed by Hexion Specialty, likewise serves as crosslinker and according to IUPAC is triethylenetetramine.

Based on a total of 100 w % and the paste divided into its components, this gives:

| Additives | Proportion of the additives [w-%] | |
|---|---|---|
| Acrylate polymer | 70.013 | |
| Dertophene T110 | 28.005 | |
| Aqueous carbon black-microsphere paste | 1.709 | |
| of which water | | 0.605 |
| Expancel 051 DU 40 | | 0.701 |
| Carbon black | | 0.403 |
| Epikure 925 | 0.140 | |
| Polypox R16 | 0.133 | |

A 4-module planetary-gear extruder 1 from Entex is used for carrying out this example of the process of the invention. Before the first module, there is an intake region in which a feed hopper feeds directly onto the central spindle 5 and in which no planetary gears 6 yet revolve around the central spindle 5.

Both the above-described acrylate polymer and the Dertophene T110 resin are fed gravimetrically into this feed shaft. To increase the efficiency of mixing further, it has been found to be advantageous to preheat the resin to 150° C. The resin is advantageously fed in as extrudate from an upstream single-screw extruder.

The acrylate polymer can be introduced as pellets. However, not for technical reasons but for economic reasons (the polymer has been produced in the production facility of the inventor itself), this polymer, too, was in this example fed in extrudate form from another extruder; thus, the pelletization step could be saved. In the most rational way of carrying out the process, this other extruder is identical to the concentrating extruder at the end of the polymer production process so as to give continuous manufacture. It has been found to be particularly advantageous to feed the extrudate of acrylate copolymer in at 140° C.

From this intake region onward, in which a cooling channel 5.1 passes through the central spindle 5, in which coolant is heated from about 41° C. to 44° C. and in which channels, into which water cooled to 50° C. is introduced, pass through the barrel and feed shaft, the composition then goes into the first module of the planetary-gear extruder 1 as a result of the axial advance of the oblique teeth of the continuous central spindle 5. Not only to remove heat introduced here by kneading but also to lower the composition temperature, both the hollow gear and also the central spindle are cooled in this first module.

Each of the four modules of the plant used had a length of about 1.1 m. The part-circle diameter of the inner set of teeth of the hollow gears was about 550 mm and the part-circle diameter of the planetary gears was about 50 mm. The central spindle turned at 30 rpm.

The FIGURE schematically shows at top left a cross section through the first module (=module 1) of the planetary-gear extruder 1 and the temperatures of the temperature-controlled water set there.

Counter to the polymer transport direction, water which has been cooled to 50° C. is pumped into the cooling channel 7.1 of the barrel 7 (=internally toothed hollow gear=hollow roller=roller cylinder) and taken off again at the beginning of the first module at about 55° C. and conveyed into a first cooling apparatus where it is cooled down to 50° C. again, in order to be reintroduced into the barrel 7 at the end of this first module. The FIGURE shows the introduction temperatures in each case of the temperature-controlled media.

The central spindle 5 is cooled via a cooling channel 5.1. Unlike the temperature-controlled channels 7.1 of the barrel 7, which are separate from module to module, the cooling channel 5.1 runs uninterrupted through the central spindle 5 just as the central spindle 5 is itself uninterrupted. For this reason, only the coolant temperature at the inlet at the end of the last, here: fourth, module can be controlled directly. At this backward point the spindle cooling water was introduced at 30° C. It goes into the end of the first module, as has been indicated by intermediate measurements and a model calculation, at 37° C. and leaves it at 41° C., in order to flow from there into the above-described intake region and be heated further to about 44° C. and then finally flow from there to a second cooling apparatus where it is cooled down to 30° C. again before being reintroduced into the cooling channel 5.1 at the end of the fourth module via a sliding seal.

The handover points from one module to the next do not have planetary gears running through them. For this reason further material can be introduced particularly easily at these handover points. The three-component paste composed of water, carbon black and microspheres is fed in gravimetrically at the handover point from the first module to the second module.

The FIGURE schematically shows at top right a cross section through the second module (=module 2) of the planetary-gear extruder 1 and the temperatures of the temperature-controlled water set there. Water at 115° C. (i.e. under superatmospheric pressure) is introduced into the barrel channel 7.1 of this module. Here, this water has a heating action and not a cooling action like the barrel temperature-controlled water in the intake region and in the first module. The cooling water of the central spindle passes at about 34° C. through the boundary between the third module and the second module and leaves the second module in the direction of the first module at about 37° C.

Owing to the good thermal conductivity of the metals used for the barrel and for the spindles, the respective surface temperature is close to the temperature of the temperature-controlled water used in each case. On the inside of the barrel 7, heat transfer calculations indicate an average surface temperature in this second module of about 112° C. On the outside of the central spindle 5, heat transfer calculations indicate an average surface temperature in this module of 38° C. The temperature difference between the two surfaces is therefore about 74° C. It leads to a substantially inhomogeneous temperature field according to the invention in the cross-sectional plane through this second module of the planetary-gear extruder.

The planetary rollers 6, which are not shown in the FIGURE in the interests of clarity, assume a temperature between these extremes. According to a modeling calculation for heat transfer, the planetary gears have a temperature of about 80° C. on the side facing the hollow gear 7 and of about 79° C. on the side facing the sun gear.

These temperature conditions lead to thin-layer expansion of the composition in remote analogy to the carbon distribution in a Damascus steel blade. The microsphere expansion is effected in the hollow gear 7 and between planetary gear 6 and hollow gear 7, but there only in the layer sufficiently close to the hollow gear surface. That the total composition has, astonishingly, nevertheless expanded homogeneously very nicely at the end, is explained by the inventor by the extraordinarily good mixing performance due to the large temperature difference which also leads to mixing of previously expanded partial amounts with not yet expanded partial amounts. The previously continuous expansion process is in this case therefore divided up in time and space into a plurality of expansion portions.

At the handover point between second module and third module, nothing further was introduced. The corresponding lid remained closed.

The FIGURE schematically shows at bottom left a cross section through the third module (=module 3) of the planetary-gear extruder 1 and the temperatures of the temperature-controlled water set there. Hot water likewise at 115° C. is introduced into the barrel channels 7.1 of this module. Here, this water has a smaller heating action than in the second module. The cooling water of the central spindle passes at about 32° C. through the boundary between the fourth module and the third module and leaves the third module in the direction of the second module at about 34° C.

Owing to the good thermal conductivity of the metals used for the barrel and for the spindles, the respective surface temperature is close to the temperature of the respective temperature-controlled water. On the inside of the barrel 7, heat transfer calculations indicate an average surface temperature in this second module of about 113° C. On the outside of the central spindle 5, heat transfer calculations indicate an average surface temperature in this module of 35° C. The temperature difference between the two surfaces is therefore about 78° C. It leads to a still somewhat more inhomogeneous temperature field in the cross-sectional plane through this third module than in the second module of the planetary-gear extruder.

In this third module, too, the planetary rollers assume a temperature between the abovementioned extremes. According to a modeling calculation for heat transfer, the planetary gears have a temperature of about 79° C. on the side facing the hollow gear and of about 78° C. on the side facing the sun gear.

As a result of these only slightly more severe temperature conditions compared to the second module, thin-layer expansion of the composition also occurs here. The microsphere expansion is effected in the hollow gear 7 and between planetary gear 6 and hollow gear 7, but there only in the layer sufficiently close to the hollow gear surface.

At the handover point from the third module to the fourth module (=module 4), the readily incorporable but temperature sensitive crosslinkers Polypox R16 and Epikure 925 were introduced gravimetrically.

The FIGURE schematically shows at bottom right, a cross section through the fourth module (=module 4) of the planetary-gear extruder 1 and the temperatures of the temperature-controlled water set there. Water at 50° C. is introduced into the barrel channels 7.1 of this module and effects cooling. The cooling water of the central spindle enters at one end at about 30° C. and passes at about 32° C. through the boundary between the fourth module and the third module.

The considerable lowering of the process temperatures in this module makes it possible for vacuum to be applied to drive out air and water vapor without significant further expansion of the microspheres. In this step, too, good distribution of the two crosslinkers is achieved.

The composition was then passed over to a conventionally heated/cooled single-screw extruder which reheated the composition to the extrusion temperature with a simultaneous buildup of pressure. Although a temperature just above the expansion start temperature of the microspheres had to be set there in order to achieve sufficiently ready flowability through the extrusion die, the combination of high pressure in this single-screw extruder and, due to previously achieved expansion, reduced gas pressure in the microspheres led to only a very small increase in expansion. The extruded profile displayed an unusually smooth surface with an average peak-to-valley height below 12 μm.

Dispensing with the highly inhomogeneous temperature field in the second and third modules of the planetary-gear extruder in a comparative experiment led to poorer homogeneity and a greater average peak-to-valley height, which is why this high inhomogeneity is considered to be causal for the success achieved. If both the spindle temperature and the hollow gear temperature in a module were above the expansion start temperature of the microspheres, optionally decreased by action of water, good homogeneity of the foam was not obtained. On the other hand, if both temperatures were below the expansion start temperature, no foaming at all occurred.

A list of reference numerals is given below as part of the description:
1 Mixing machine, planetary-gear extruder
2 Mixing space in the mixing machine 1
3 First surface which has a temperature $T_3$ and bounds the mixing space 2
4 Second surface which has a temperature $T_4$ and bounds the mixing space 2
5 Central spindle of a planetary-gear extruder=sun gear=sun roller
5.1 Cooling channel in 5
6 Planetary rollers of a planetary-gear extruder
7 Internally toothed hollow gear of a planetary-gear extruder=hollow roller
7.1 Cooling channel in 7
$T_E$ Expansion temperature

The invention claimed is:

1. Process for producing a syntactically foamed polymer composition, where
   a) at least a majority of closed foam voids are achieved by introduction of expandable microspheres into a matrix material and subsequent mixing in a mixing machine (1) and
   b) the expansion of the expandable microspheres is carried out after they have been introduced into the matrix material,
   c) where the temperature distribution in the mixing machine (1) is inhomogeneous in a plane perpendicular to a transport direction of this machine (1),
   wherein
   d) a first surface (3) bounding a mixing space (2) of the mixing machine (1) is, in a plane perpendicular to a transport direction of the mixing machine (1), maintained at a temperature which is sufficiently high for the polymer composition containing the microspheres, insofar as it comes into contact with this first bounding surface (3), to reach a temperature Te which is the minimum temperature that allows for commencement and continuation of expansion,
   e) while in the same plane perpendicular to a transport direction of the mixing machine (1), a second surface (4) bounding the mixing space (2) of the mixing machine (1) is maintained at a temperature which is sufficiently low for polymer composition present in the microspheres, insofar as it comes into contact with this second bounding surface (4), not to reach a temperature Te which is the minimum temperature that allows for commencement and continuation of expansion.

2. Process according to claim 1,
   f) wherein the mixing machine (1) is a planetary-gear extruder c') and an externally toothed central spindle (5) thereof and an internally toothed hollow gear (7) thereof are maintained at different temperatures in at least one cross-sectional plane in such a way d') that said temperature (Te) is reached in the polymer composition containing the microspheres insofar as it comes into contact with the first of these two components (5 or 7), e') while said temperature Te is not reached in the polymer composition containing the microspheres, insofar as it comes into contact with the second of these two components (7 or 5).

3. Process according to claim 2, d'1) wherein the internally toothed hollow gear (7) of the planetary-gear extruder (1) is maintained at a temperature which is sufficiently high for a said temperature Te to be reached in the polymer composition containing the microspheres, insofar as it comes into contact with this hollow gear (7), e'1) while the externally toothed central spindle (5) is maintained at a temperature which is sufficiently low for said temperature Te not to be reached in the polymer composition containing the microspheres, insofar as it comes into contact with this sun gear (5).

4. Process according to claim 3, wherein the matrix base polymer is introduced onto the cool central spindle 5 in the intake region of the planetary-gear extruder (1).

5. Process according to claim 3, wherein a coolant in the interior of the central spindle (5) flows counter to the polymer transport direction.

6. Process according to claim 2, d'2) wherein the internally toothed hollow gear (7) of the planetary-gear extruder (1) is maintained at a temperature which is sufficiently low for said temperature Te not to be reached in polymer composition present in the microspheres, insofar as it comes into contact with this hollow gear (7), e'2) while the externally toothed central spindle (5) is maintained at a temperature which is sufficiently high for said temperature Te to be reached in the polymer composition containing the microspheres, insofar as it comes into contact with this central spindle (5).

7. Process according to claim 6, wherein the temperature difference between the cooler hollow gear and the central spindle is at least 50° C.

8. Process according to claim 7, wherein polyethylene and/or polypropylene and/or polyethylene-vinyl acetate and/or polypropylene-vinyl acetate and/or copolymers of some or all of the monomers mentioned are used as matrix base polymer, optionally together with a tack-increasing resin.

9. Process according to claim 6, wherein the matrix base polymer is introduced onto the hot central spindle 5 in the intake region of the planetary-gear extruder (1).

10. Process according to claim 6, wherein a coolant in the hollow gear (7) flows counter to the polymer transport direction.

11. Process according to claim 1, wherein the temperature difference between the first surface (3) bounding the mixing space (2) of the mixing machine and the second surface (4) bounding the mixing space (2) of the mixing machine is at least 50° C.

12. Process according to claim 1, wherein the temperature difference between said first surface (3) and the said second surface (4) is at least 50° C.

13. Process according to claim 12, wherein acrylates and/or methacrylates are used as matrix base polymer, optionally together with a tack-increasing resin.

14. Process according to claim 1, wherein the expandable microspheres are firstly suspended in water before being introduced into the polymer composition and remain in this aqueous environment for at least 12 h before this water-microsphere suspension is introduced into and mixed with the matrix-forming polymer composition.

15. Process according to claim 14, in which carbon black is mixed into the polymer composition, wherein the carbon black is firstly emulsified or suspended in water and the microspheres are then suspended in this carbon black-water emulsion or suspension before this carbon black-water-microsphere suspension is introduced into and mixed with the matrix-forming polymer composition.

16. Process according to claim 14, wherein the expansion of the microspheres is started at at least 8° C. below the expansion start temperature thereof.

17. Process according to claim 14, wherein the water content of the mixture is reduced further at any time after introduction of the aqueous microsphere suspension into the matrix material.

18. Process according to claim 17, wherein the evaporation of the water is forced by application of subatmospheric pressure only after a homogeneous distribution of the microspheres in the matrix-forming composition has been attained.

19. Process according to claim 1, wherein the polymer composition containing microspheres f) is applied in a single layer to a support of a single-sided self-adhesive tape to be formed or g) is applied in a single layer to each of the two sides of a support of a double-sided self-adhesive tape to be formed or h) is applied in a single layer to a liner, after which this composite is either laminated with a composite or itself forms a double-sided, support-free self-adhesive tape.

* * * * *

UNITED STATES PATENT AND TRADEMARK OFFICE
CERTIFICATE OF CORRECTION

PATENT NO.       : 9,499,676 B2
APPLICATION NO.  : 14/273144
DATED            : November 22, 2016
INVENTOR(S)      : Burmeister et al.

It is certified that error appears in the above-identified patent and that said Letters Patent is hereby corrected as shown below:

In the Specification

Column 9, Line 62, "15°C" should read -- ≤15°C --.

Signed and Sealed this
Sixth Day of June, 2017

Michelle K. Lee
*Director of the United States Patent and Trademark Office*